United States Patent [19]
Wood

[11] Patent Number: 5,519,262
[45] Date of Patent: May 21, 1996

[54] NEAR FIELD POWER COUPLING SYSTEM

[76] Inventor: Mark B. Wood, 448 W. 3400 South, Bountiful, Utah 84010

[21] Appl. No.: 977,807

[22] Filed: Nov. 17, 1992

[51] Int. Cl.$^6$ ...................................................... H02J 7/00
[52] U.S. Cl. ............................................. 307/104; 323/222
[58] Field of Search .......................... 307/3, 104; 191/10, 191/13–16; 104/292; 340/870.25, 870.31, 870.37; 323/222, 328, 329, 307, 308, 261

[56] References Cited

U.S. PATENT DOCUMENTS

| | | | |
|---|---|---|---|
| 3,167,168 | 1/1965 | Park | 198/31 |
| 4,023,753 | 3/1977 | Dobler | 246/5 |
| 4,331,225 | 5/1982 | Bolger | 191/10 |
| 4,459,438 | 7/1984 | Kaiser | 191/10 |
| 4,603,640 | 8/1986 | Miller | 104/282 |
| 4,689,530 | 8/1987 | Nakamura | 310/12 |
| 4,800,328 | 1/1989 | Bolger | 320/2 |
| 4,833,337 | 5/1989 | Kelley | 307/11 |
| 4,836,344 | 6/1989 | Bolger | 191/10 |
| 4,879,522 | 11/1989 | Arai et al. | 340/870.31 |

*Primary Examiner*—Peter S. Wong
*Assistant Examiner*—Aditya Krishnan
*Attorney, Agent, or Firm*—Jon C. Christiansen; Lee A. Hollaar; Daniel P. McCarthy

[57] ABSTRACT

A system for power coupling independent of the position of the receiver over a surface. This is achieved by developing a spatially-dependent phase shift in the electromagnetic field generated by the power transmitter. The power inputs to the power receiver are then driven 180 degrees out of phase at any coordinate in the plane over the surface. An array of elements is placed in a plane below a surface and driven with a series of alternating current power sources. Consecutive adjacent elements across the area of the plane are driven with uniformly increasing phase shift. An integral multiple of adjacent consecutive elements results in a 180 degree phase shift. Pairs of field receiving elements in a power receiver are dimensioned to receive fields that are separated by 180 degrees of phase. Utilizing the technique of the invention, power coupling independent of the position or rotational orientation of the power receiver can be obtained.

14 Claims, 10 Drawing Sheets

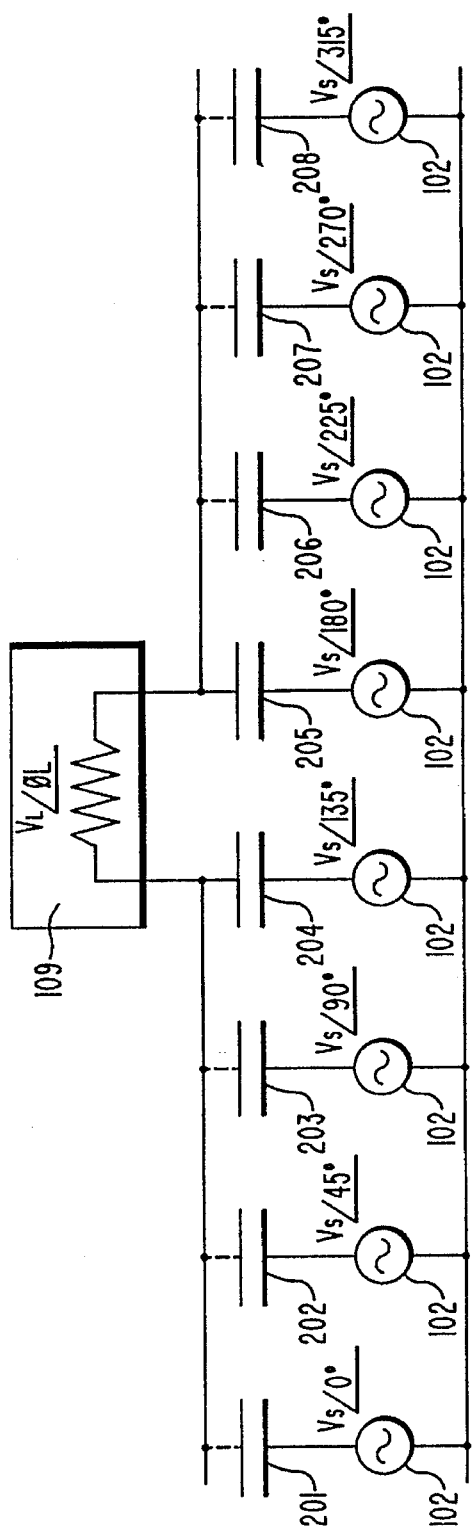
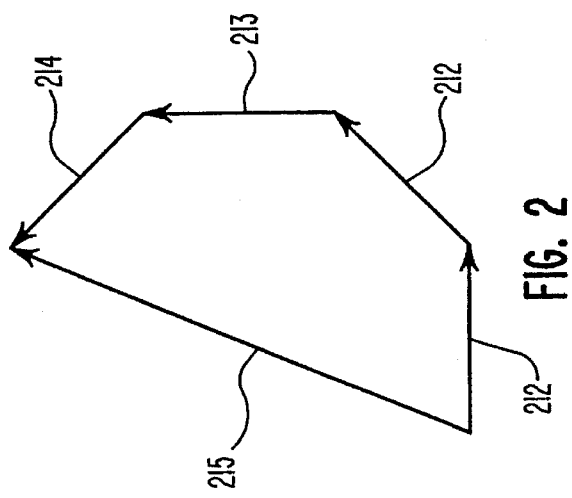
FIG. 2

NEAR FIELD POWER COUPLING SYSTEM

BACKGROUND OF THE INVENTION

1. Field of the Invention

This invention relates to power couplings employing electromagnetic near fields, and in particular those using inductive or capacitive couplings to transmit electrical power to a load without electrical or mechanical contact.

2. Description of Related Art

Inductive or capacitive power couplings (herein referred to as near field power couplings) transfer power by means of electromagnetic near fields generated between capacitive plates or inductive windings. Since electromagnetic fields can travel through a variety of mediums (particularly air), electrical contacts are not required to couple power to a load. Contactless near field power couplings eliminate the friction, arcing, wear, mechanical stress, and inaccessibility associated with electrical contacts. They are particularly advantageous in powering mobile vehicles. In these applications, batteries or other energy storage devices can be eliminated while maintaining considerable mobility.

In the present invention, power is coupled by phased electromagnetic near fields. In general, electromagnetic fields are comprised of induction, electric, and radiation field components. Energy contained in the induction and electric fields does not radiate but rather is stored and returned to the circuit during each cycle. Within approximately one sixth of a wavelength from an electromagnetic field generating element, the induction and electric field components dominate. Thus, electromagnetic fields dominated by induction and electric field components are termed near fields. The energy in the near field is substantially higher than in the corresponding radiation or far field. Most of this energy is not radiated but rather is stored and returned to the circuit during each cycle.

Numerous applications for near field power couplings exist in the prior art. These include those for providing power to vehicles, such as in U.S. Pat. No. 4,800,328 issued to Bolger on Jun. 6, 1989, and U.S. Pat. No. 4,836,344 issued to Bolger et al. on Jan. 24, 1989.

Lacking in the prior art is a means for providing continuous power and control to a load as it is positioned at various locations (positional independence). This is a significant disadvantage in applications requiring a high degree of mobility. For example, a robot might be programmed to move to any coordinate in a plane over a planar surface. It would be desirable to provide near field power and control coupling to the robot at any of those coordinates. However, prior art near field applications are limited by discontinuities or dead spots in the electromagnetic field across a planar surface.

In the case of the roadway power system described in U.S. Pat. No. 4,836,344, the power receiver is limited to the area directly over each inductive module. If multiple inductive modules are activated at once, the magnetic fields from adjacent modules tend to cancel at midpoints between modules, creating dead zones in which no power is provided. These dead zones in this and in other prior art result from phase cancellation in the generated electromagnetic fields when driving two inputs to a power coupling receiver. In these circumstances, the effective result is that the two inputs to the receiver are driven in phase.

SUMMARY OF THE INVENTION

It is an object of the present invention to provide power coupling independent of the position of the receiver over a surface. This is achieved by developing a spatially-dependent phase shift in the electromagnetic field generated by the power transmitter. The power inputs to the power receiver are then driven 180 degrees out of phase at any coordinate in the plane over the surface.

The present invention has an array of elements placed in a plane below a surface and driven with a series of alternating current power sources. Consecutive uniformly spaced adjacent elements across the area of the plane are driven with uniformly increasing phase shift. An integral multiple of adjacent consecutive elements results in a 180 degree phase shift. Pairs of field receiving elements in a power receiver are dimensioned to receive fields that are separated by 180 degrees of phase.

While in many common uses, the power receiver will be positioned above a planar surface, the system of the invention can be extended to various nonplanar geometries as well. The only requirement imposed by the invention is that the fields be phased and the receiver be dimensioned such that an out of phase coupling exists between the two inputs of the receiver.

It is another object of the present invention to provide power coupling independent of the rotational orientation of the power receiver relative to the power generator. This is achieved by utilizing a power receiver comprising a number of wedge-shaped elements forming a circular pickup.

Another object of the system is that control signals can easily be coupled between the power transmitter and the power receiver without additional transmitting or receiving hardware. The control signals can be transmitted by superimposing (modulating or overlaying) the control signal on the power signal. Overlaying the power signal is achieved by driving the generating elements with a higher-frequency control signal having the same spatial phasing as the power signal. Standard modulation techniques (such as amplitude, phase, frequency, or pulse modulation) can then be used with this higher-frequency carrier to convey the control signals. Thus, the control signals are available to the receiver with the same positional independence as the power signal.

Another object of the present invention is to eliminate the need for switches in generating and controlling the transmitted electromagnetic field. This results in a more reliable system that can be manufactured at low cost. In the case of capacitive coupling, low cost printed circuit technology can be used to fabricate electric field generating elements from etched copper. In the case of inductive coupling, magnetic cores can be molded from powdered ferrite embedded in epoxy.

These and other features of the invention will be more readily understood upon consideration of the attached drawings and of the following detailed description of those drawings and the presently preferred embodiments of the invention.

BRIEF DESCRIPTION OF THE DRAWINGS

FIG. 2 is a circuit that approximately models the embodiment illustrated in FIG. 1, and its phasor diagram.

DETAILED DESCRIPTION OF THE INVENTION

Figure 1:
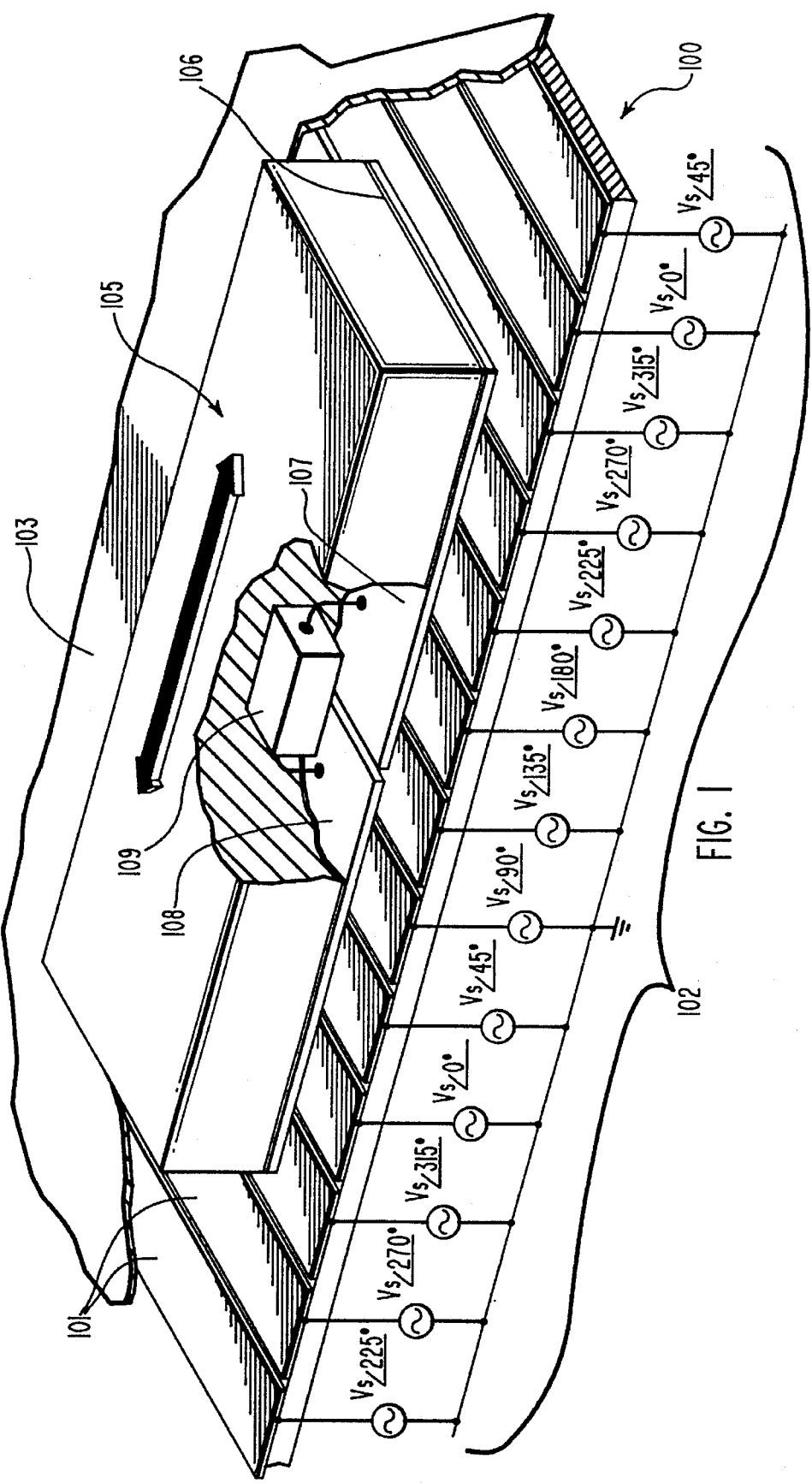
FIG. 1 illustrates an embodiment providing positional, but not rotational, independence utilizing capacitive coupling.

The basis of spatially-dependent phased-shifted field power coupling can be understood by examining the simplified capacitive power coupling system of FIG. 1. The embodiment of the invention illustrated in FIG. 1 provides positionally, but not rotationally, independent power coupling. Transmitter 100 is comprised of a series of electromagnetic near field generating capacitive plates 101 driven by a series of incrementally phase-shifted power sources 102. Power sources 102 are equal in amplitude and frequency.

Generating plates 101 are comprised of copper traces on a printed circuit board or other means for producing electrically-conductive plates. They are covered with a dielectric conformal coating 103, such as epoxy. A spatially-dependent phase shift exists between the electromagnetic near field generated over each successive generating plate 101 due to the incremental phase shift between power sources 102.

Receiver 105 is comprised of two rectangular electromagnetic near field receiving capacitive plates 107 and 108 mounted on a dielectric sheet 106 and connected to a load. Receiving plates 107 and 108 are comprised of copper traces on a printed circuit board, or other means for having conductive plates held in a given position. Receiving plates 107 and 108 are dimensioned to couple to fields having 180 degrees of phase shift. A 180 degree phase shift is present between fields having approximately four generating plate 101 widths of spacing between them. Generating plates 101 are capacitively coupled to receiving plates 107 and 108 located in close proximity above them.

Receiver 105 can change its position relative to transmitter 100 either in the "along" direction, where it moves in the direction generating plates 101 extend, or the "across" direction, where receiver 105 moves in the direction to perpendicularly cross a series of generating plates 101. Any change in position of receiver 105 can be viewed as a movement both along and across generating plates 101.

It can be readily seen that a movement of receiver 105 along generating plates 101 results in no change in the power coupling between transmitter 100 and receiver 105.

Analyzing the effects on power coupling as receiver 105 moves across generating plates 101 is somewhat more complex, but can be done using phasor diagrams. Because of their inherent linearity, electromagnetic near fields are spatially additive.

FIG. 2 shows an electrical circuit equivalent to that of FIG. 1, but explicitly showing the capacitors 201 through 208 formed by generating plates 101 and receiving plates 107 and 108. The top plate of capacitors 201 through 204 is receiving plate 108, and the top plate of capacitors 205 through 208 is receiving plate 107. In the phasor diagram in FIG. 2, phasor 211 is the power contribution of capacitors 201 and 205, phasor 212 is the power contribution of capacitors 202 and 206, phasor 213 is the power contribution of capacitors 203 and 207, and phasor 214 is the power contribution of capacitors 204 and 208. Phasor 215 is the sum of phasors 211 through 214.

Figure 3:
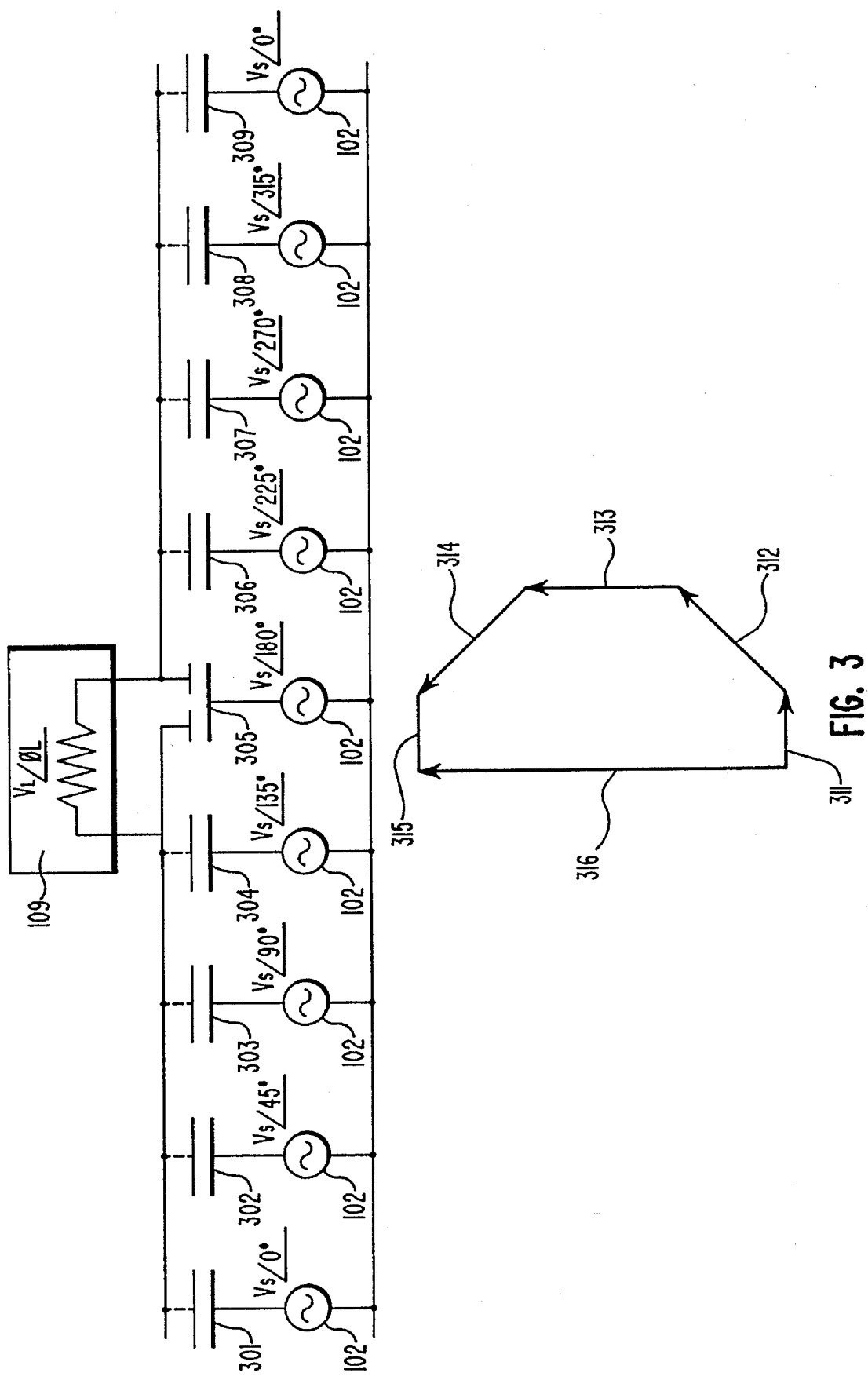
FIG. 3 is the circuit of FIG. 2 after the receiver has moved half-way across a generating plate, and its phasor diagram.

FIG. 3 shows the equivalent electrical circuit after receiver 105 has moved a distance equal to half the spacing of one of generating plates 101. Capacitor 301 is now only half the size of capacitor 201, since receiving plate 108 now only covers about half of the generator plate that forms the bottom plate of capacitor 301. Capacitor 305 has two top plates, one being that portion of receiving plate 108 that now covers part of generator plate forming the bottom plate of capacitor 305, and the other being that portion of receiving plate 107 also covering part of the generator plate forming the bottom plate of capacitor 305.

In the phasor diagram, phasors 311 through 315 are the power contributions of capacitors 301 through 305 coupled with capacitors 305 through 309, respectively. The magnitudes of phasors 311 and 315 reflect the reduced contribution to power transfer by capacitors 301 and 305 due to their decreased size. Phasor 316 is the sum of phasors 311 through 315. As can be seen, phasor 316 has approximately the magnitude of phasor 216 (phasor 216 is approximately ten percent larger).

Figure 4:
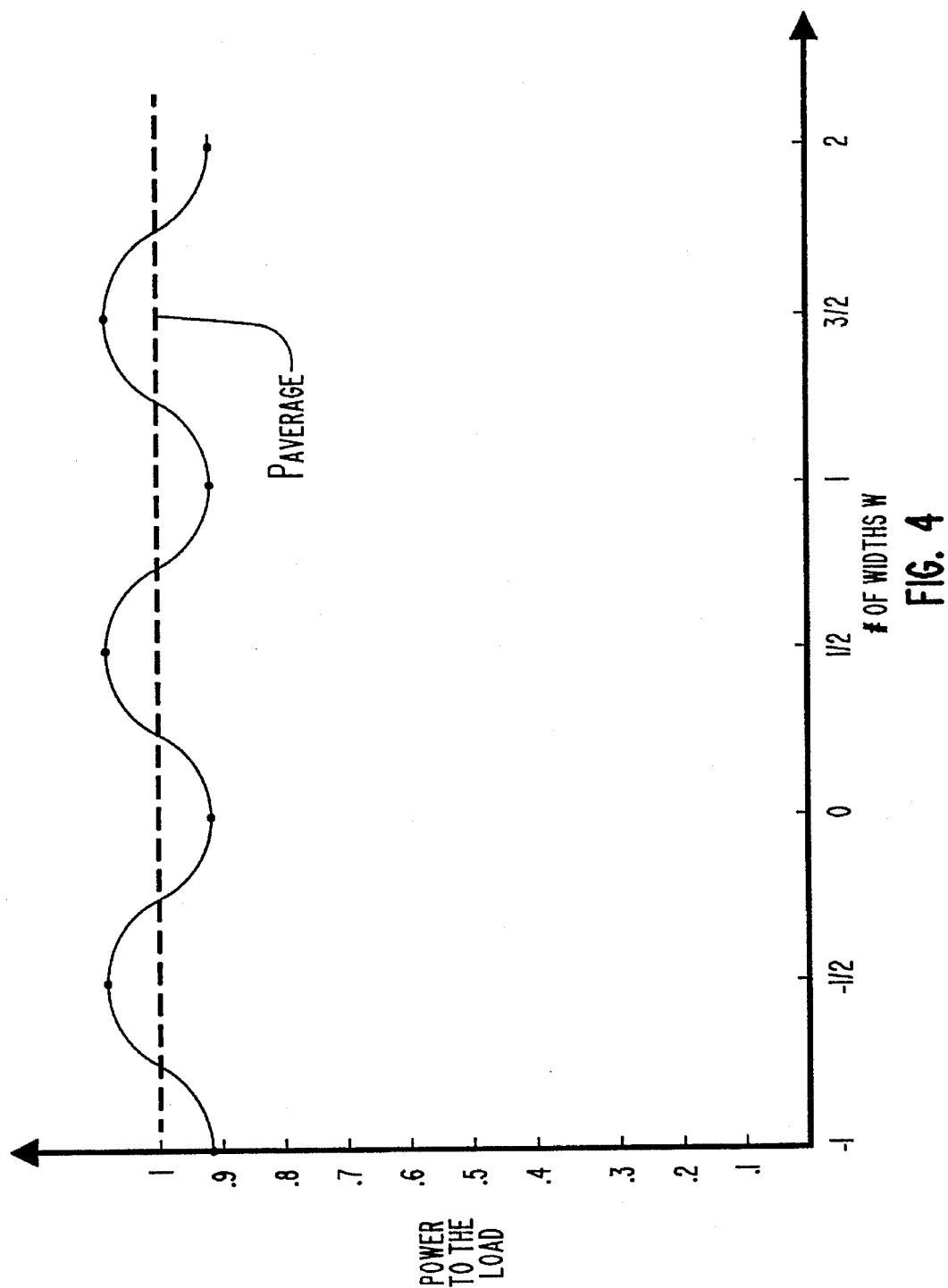
FIG. 4 graphs the power delivered to the load as the receiver is moved across the generating plates.

To show the dependence on lateral position a normalized plot is provided in FIG. 4. The vertical axis plots the normalized voltage across the load and the horizontal axis plots relative lateral position in generating plate 101 widths. As can be seen, when the receiver 105 moves across successive generating plates 101, the power to load 109 remains approximately constant.

The dependence on lateral position can be reduced by increasing the number of generating plates 101 under receiving plates 107 and 108 and decreasing the incremental phase shift between each power source 102 by the same ratio. This results in a smaller phase variation with lateral position between successive generating plates. In the limit of an infinite number of generating plates located under each receiving plate, phase and power are independent of lateral position.

If the nature of load 109 requires that there be little or no power variation with the position of receiver 105, a power regulator can be inserted between receiving plates 107 and 108 and load 109. Because of the small variation in power transfer as receiver 105's position is changed inherent in the present invention, such a power regulator can be implemented using techniques well known in the art.

Since the power transfer is independent of the position of receiver 105 in the "along" direction and relatively independent of the position of receiver 105 in the "across" direction, clearly it is relatively independent of the position of receiver 105 anywhere on the surface above generating plates 101 that form transmitter 100.

Another embodiment of the invention replaces the capacitive coupling with inductive coupling. In that embodiment, generating plates 101 are replaced by windings connected across the phased voltage sources, and receiving plates 107 and 108 are replaced by windings oriented parallel to the generator windings.

In the above system, power transfer to the load is proportional to the capacitive impedance between transmitter 100 and receiver 105. A decrease in capacitive impedance will increase power transfer. The capacitive impedance can be reduced by increasing the coupling area between receiving and transmitting plates, decreasing the gap between the plates, increasing the operating frequency, or increasing the operating voltage across the plates. The area of the plates is determined by the application. The gap should be minimized in all cases.

The operating frequency is limited by RF emissions and power efficiency in the sources. Standards set by the Federal Communications Commission in the United States, as well as regulations adopted by other governments, require that electromagnetic emissions be well contained above 30 MHz. Low distortion RF power amplifiers, such as those operating in class C or D, can be used for the power sources. If a transformer is used, 180 degrees of phase shift is available between the secondary outputs. In the preferred embodiment, the operating frequency is maintained within 300 KHz to 1 Mhz.

The operating voltage is limited by dielectric breakdown voltage, safety considerations, and RF emissions. Power transfer increases with the square of the voltage. In certain high power applications, where the system is completely contained, voltages above 10 Kvolts may be practical. In the preferred embodiment, with a power output in the range of 10 watts to 100 watts, 50 to 300 volts is sufficient.

Figure 5:
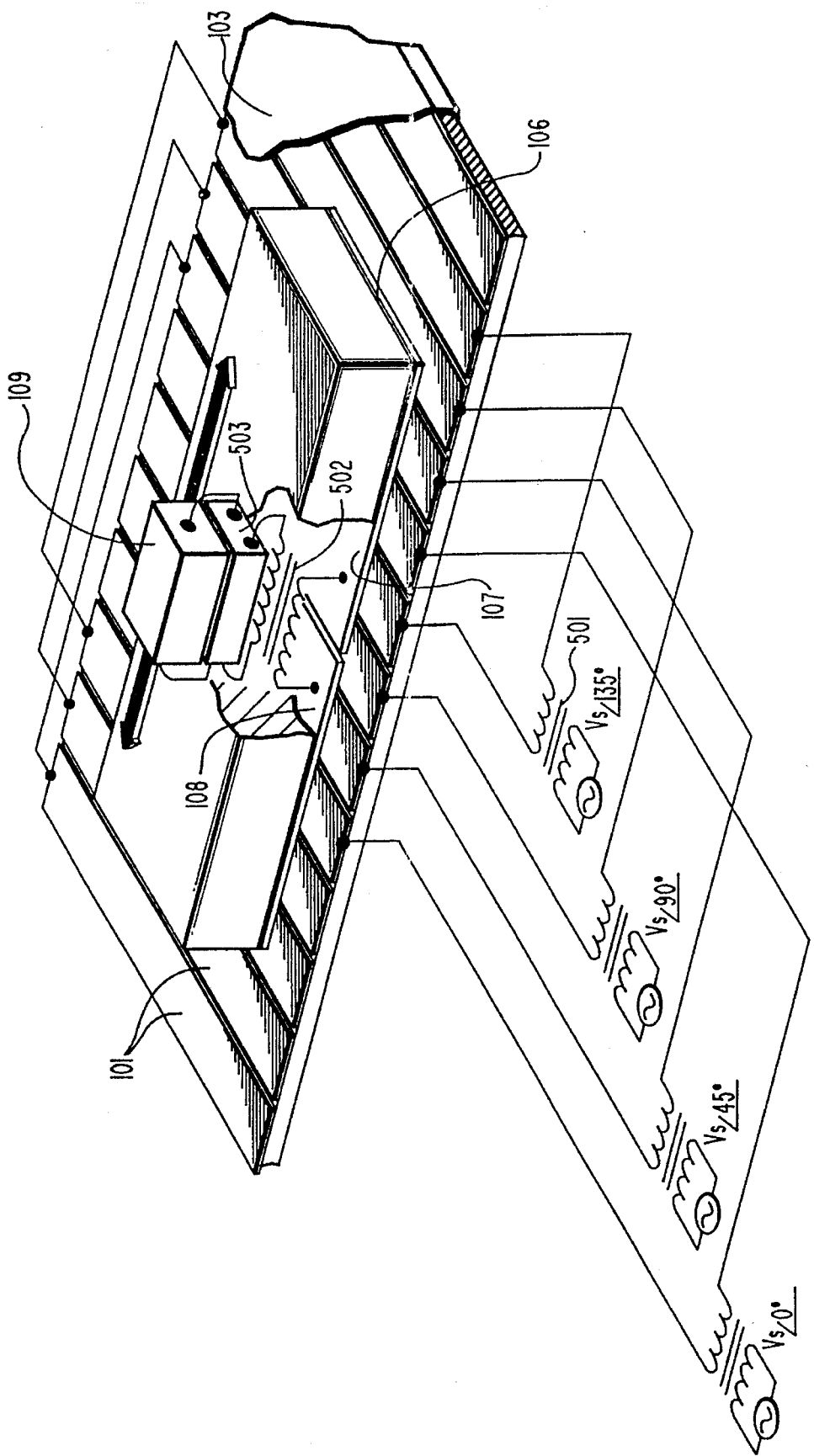
FIG. 5 illustrates an embodiment that provides improved impedance matching.

An improved embodiment of the system of FIG. 1 is shown in FIG. 5. Drive and receiving transformers 501 and 502 are added to the coupler of FIG. 1 to provide impedance matching and isolation. Drive transformers 501 also provide voltage step-ups and 180 degrees of phase shift across every fourth generating plate 101. Also added to the receiver in FIG. 1 is power regulator 503 to provide power regulation to the load 109. Power regulator 503 is connected to the secondary winding of receiver transformer 502. The primary of receiver transformer 502 is connected to receiving plates 107 and 108. Receiver transformer 502 provides an impedance match between the regulated load 109 and the effective source impedance of the transmitter.

Figure 6:
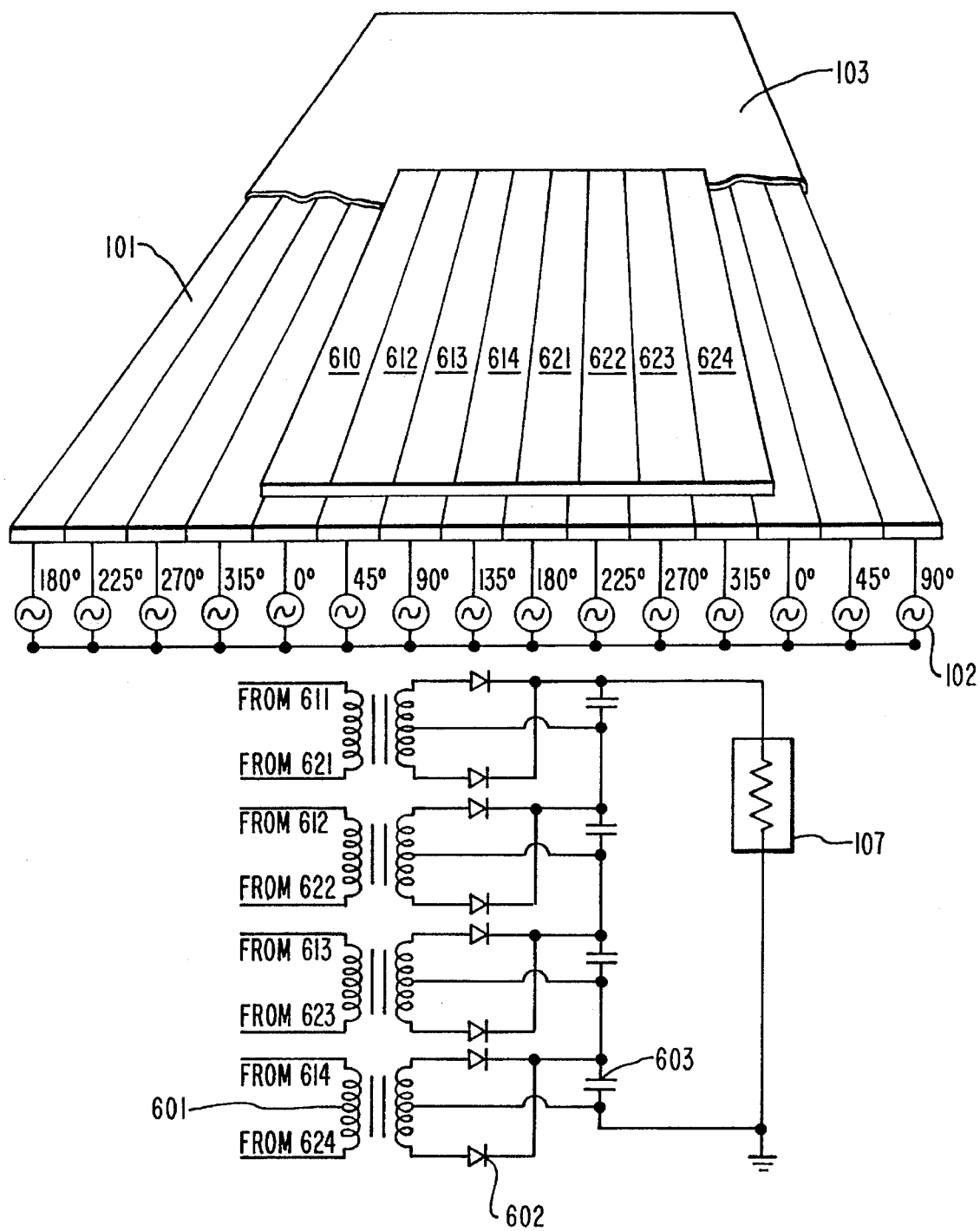
FIG. 6 illustrates an embodiment replacing each receiving plate with a plurality of plates.

Another embodiment of capacitive power coupling having improved coupling per unit area and less "across" dependence is shown in FIG. 6. In this embodiment, receiving plates 611 through 614 and 621 through 624 have the same width and spacing as generating plates 101. When placed in parallel with generating plates 101, each receiving plate 611 through 614 and 621 through 624 is coupled to one or two of generating plates 101, depending on their relative lateral position.

As indicated in FIG. 6, the primaries of receiver transformers 601 are connected across the pairs of receiving plates coupled to generating plates 101 having 180 degrees of phase separation. The secondaries of transformers 601 are connected to rectifiers 602, which are connected to output filter capacitors 603. A DC voltage is generated at the output of the capacitors 603 which is proportional to the amplitude of the secondary AC voltage. The filters are connected in series, so the DC output voltages add to produce the voltage across the load 109. This embodiment trades additional transformers in the receiver for improved coupling and lateral independence.

A drawback of the embodiments discussed above is that they lack rotational independence. This can be seen by considering the phasing across receiver plates 107 and 108 as the receiver is rotated. When the receiver 105 is rotated 90 degrees from the position shown in FIG. 1, receiver plates 107 and 108 are driven in phase. This results in phase cancellation across the load and no power is delivered to the load.

Figure 7:
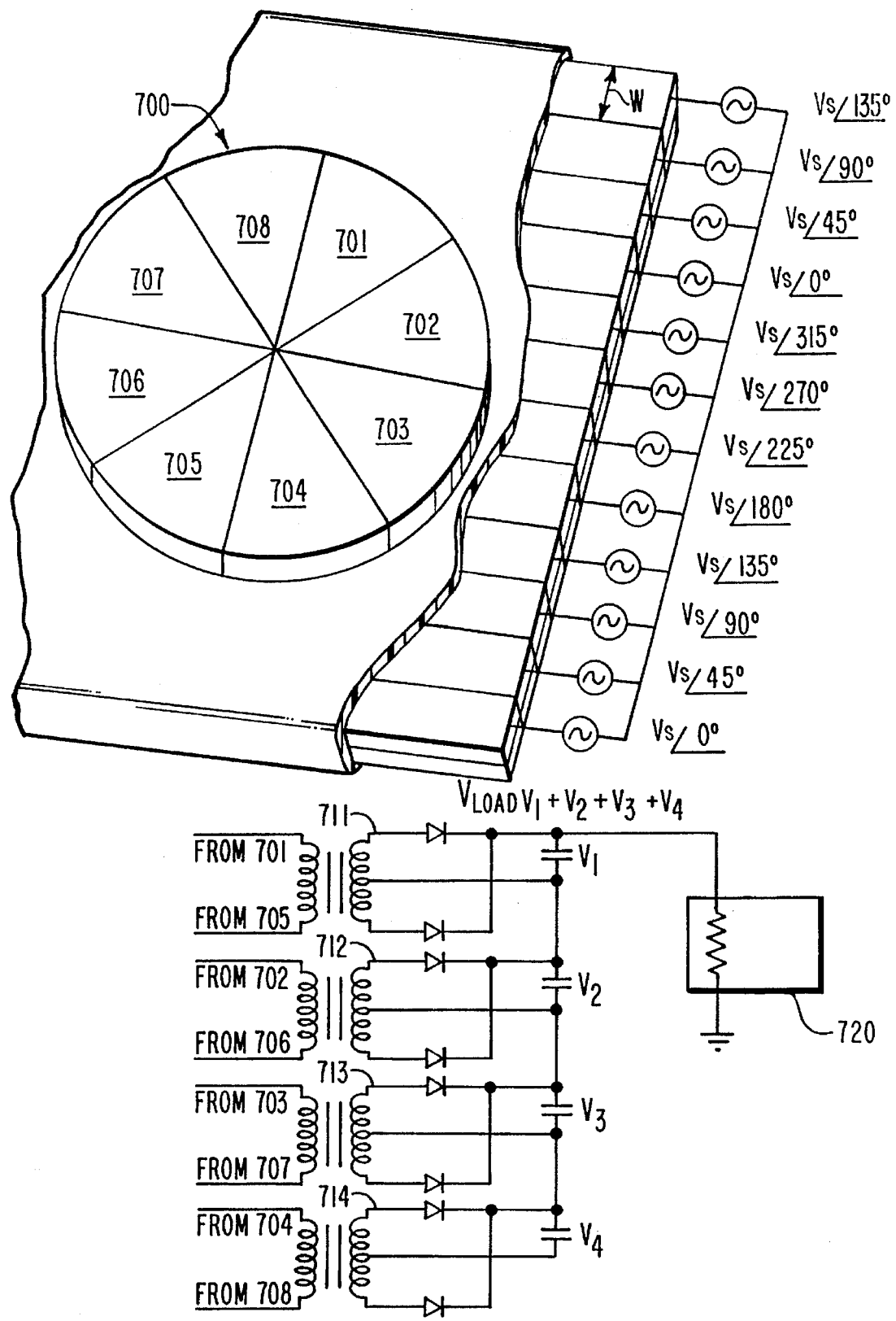
FIG. 7 illustrates the preferred embodiment of the invention, using wedge-shaped receiving plates to provide rotational independence.

The preferred embodiment of the present invention, shown in FIG. 7, improves on the embodiment of FIG. 5 by adding rotational independence. In this embodiment, multiple wedge-shaped sectional receiving elements are arranged in a circular area 700. Diagonally opposed pairs of elements 701 and 705, 702 and 706, 703 and 707, and 704 and 708 are connected to the primary windings of transformers 711, 712, 713, and 714 respectively.

The voltage across each primary winding is proportional to the difference in the fields coupled to each diagonally opposed receiver element. The voltage across the secondary winding of each transformer is rectified and filtered to produce a DC output voltage. The DC voltage across the load 720, is proportional to the sum of the magnitudes of the AC voltages across the primary windings.

Figure 8A:
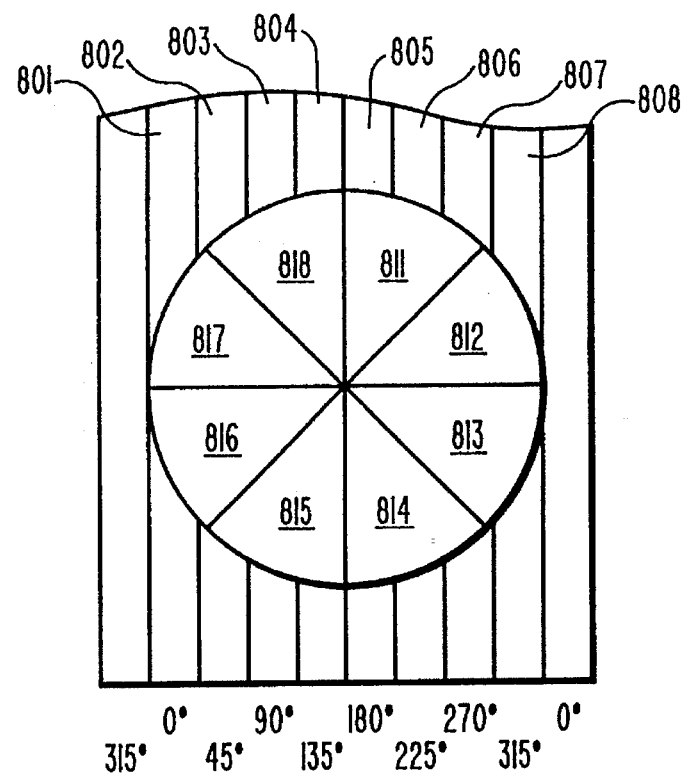
FIG. 8 illustrates the wedge-shaped receiving plates of FIG. 7 in two different positions.

The magnitude and phase of the total field coupled to each receiving element 701 through 708 is determined by the coupling area and phase of the underlying capacitive generating plates. The total field is the sum of the fields coupled from each capacitive generating plate. To visualize the coupling areas between the generating plates and receiving elements, a top view of the coupler of FIG. 7 in two positions is provided in FIG. 8. In FIG. 8A, it can be seen that wedge-shaped elements 811 through 814 behave much as receiving capacitive plate 107 in FIG. 1, and elements 815 through 818 behave like capacitive plate 108.

Figure 8B:
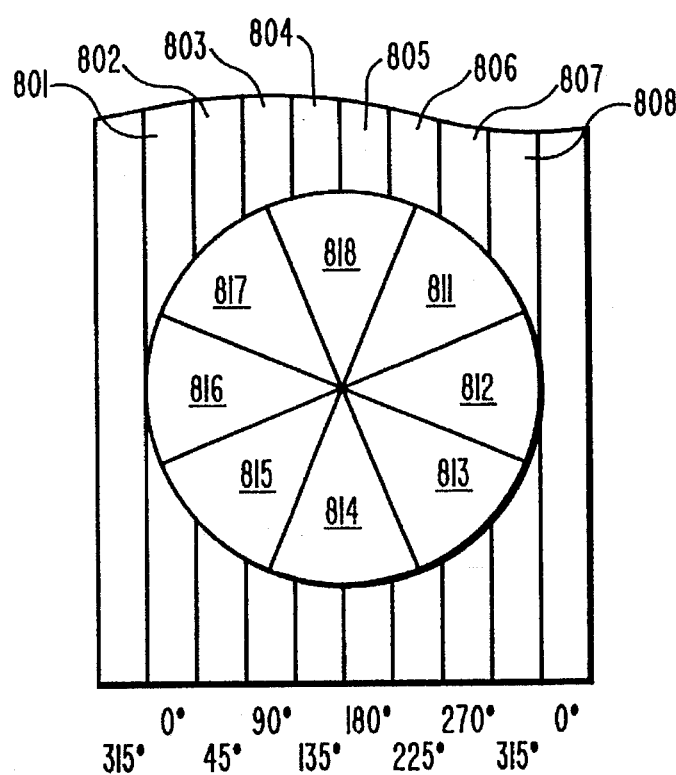

In FIG. 8B, the wedge-shaped elements 811 through 818 have been rotated clockwise by 22.5 degrees. In this position, elements 814 and 818 are positioned identically with respect to the capacitive generating plates 801 through 808, and so don't contribute to the power transfer. However, elements 811 and 815 are now positioned more in the "across" direction with respect to generating plates 801 through 808, with a resulting higher power coupling, compensating in part for the loss of power coupling by elements 814 and 818.

The voltages across each of the primary windings of the transformers 711 through 714 are proportional to the difference in fields coupled to pairs of sectional elements. For optimum rotational independence the radius of the circle containing the sectional elements should be approximately four times the width of a capacitive generating plate.

The rotational dependence can be reduced by increasing the number of receiving plates. This can be seen by observing that the angular rotation between elements is decreased with an increase in the number of receiving elements. Thus, the receiver returns to equal coupling with the transmitter after a smaller angle of rotation and the rotational variation is reduced. Practical considerations determine the number and shape of capacitive generating plates and receiving elements used in each case. In most applications, no more than sixteen capacitive generating plates located under eight receiving elements are required.

In addition to the planar systems previously discussed, nonplanar or curved systems are practical as well. Curved tracks for toy vehicles can be fabricated using plastic molds. Printed circuit processing can be used to create a variety of patterns for the generating plates and receiving elements.

Figure 9:
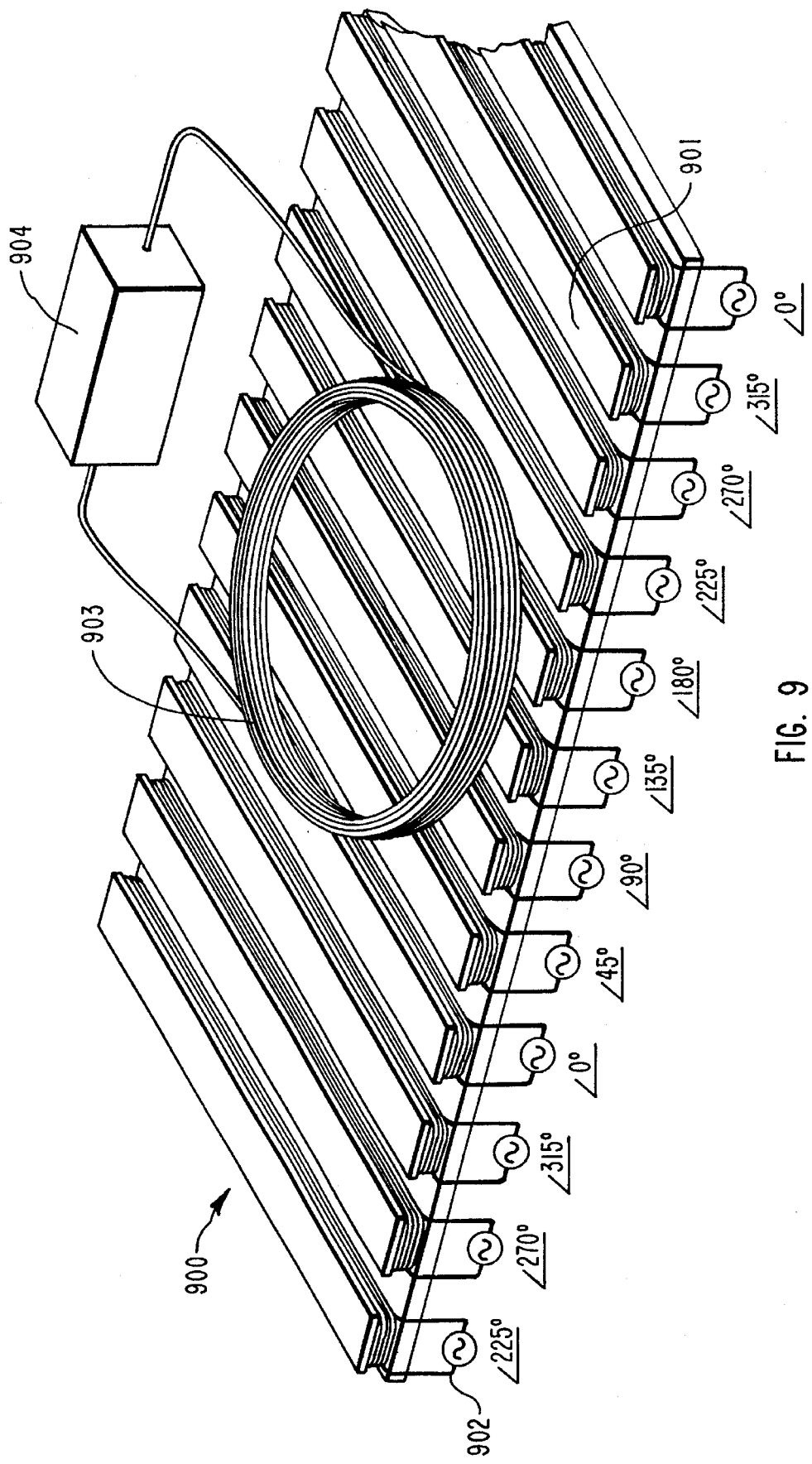
FIG. 9 illustrates an alternate embodiment of the invention, utilizing inductive coupling.

Another type of phased power coupling, within the scope of the present invention, uses inductive power coupling. In these embodiments, inductive windings are used to generate and receive induction near fields. A preferred embodiment of inductive power coupling is shown in FIG. 9. In a manner analogous to the above capacitive couplings, transmitting elements 901 comprised of inductive windings are placed in a plane and driven by a series of phase shifted power sources 902. The electromagnetic near field generated by the transmitting elements 901 is dominated by the induction field component. The induction field generated over each transmitting element 901 has a vector component perpendicular to the plane of the transmitter 900. An inductive power receiving element 903 is comprised of several receiving windings wound in a circular loop. Receiving element 903 couples to the induction field component which is perpendicular to its loop plane. Power is delivered to a load 904 which is directly connected to 903. Impedance matching is accomplished by setting the appropriate turns ratio of the number of windings in 903 to the number of windings in 901.

The total field coupled to 903 is the sum of the fields coupled from each underlying transmitting element 901. Because of the inherent rotational symmetry of receiving element 903, power coupled to the load 904 is independent of rotational position. Lateral independence, due to spatial phasing of the fields, is approximately equal to that provided by the capacitive coupling system previously discussed.

Figure 10:
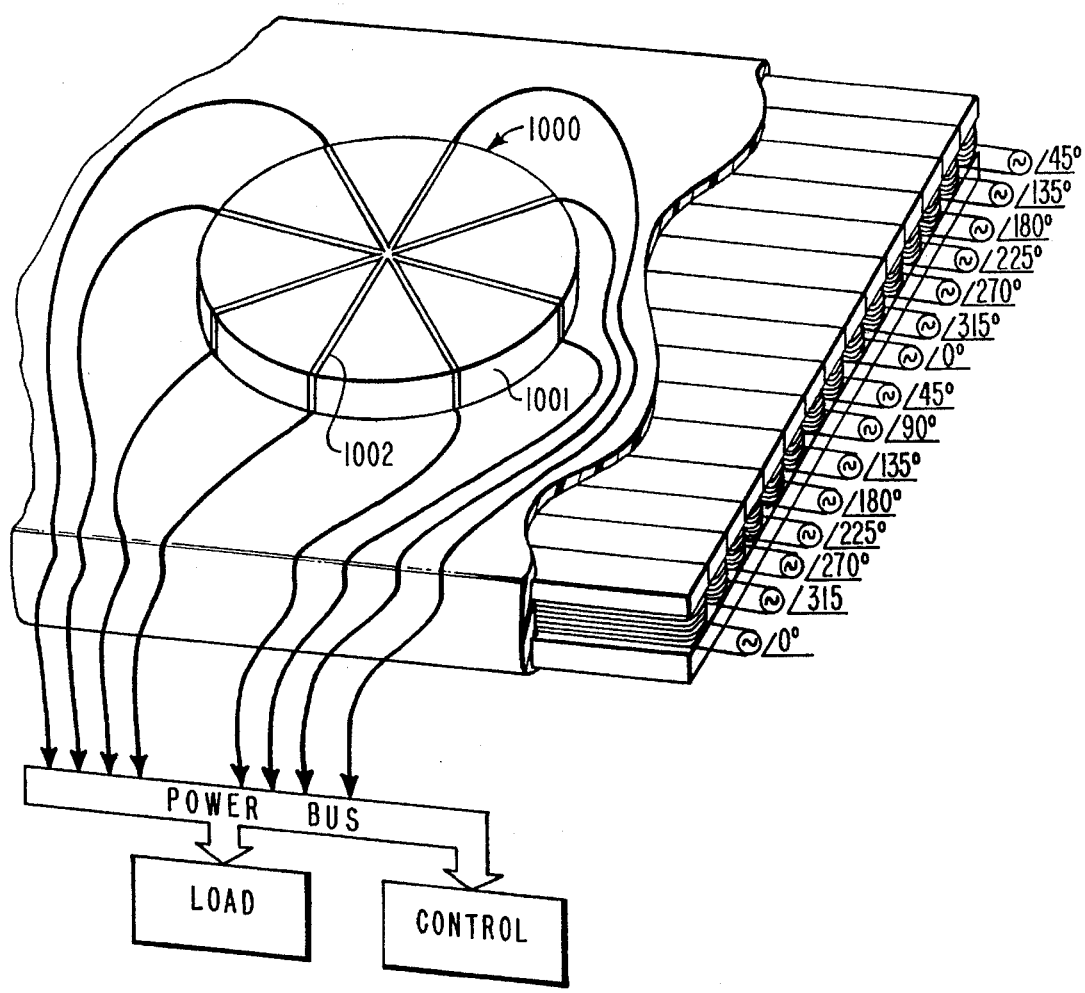
FIG. 10 illustrates another embodiment of the invention using inductive coupling.

In a second inductive coupling embodiment shown in FIG. 10, the power receiver 1000 contains of a notched ferrite disk 1001 around which receiving inductive windings 1002 are wound. Disk 1001 is a high permeability ferrite disk which provides a low reluctance path for the induction field generated by the transmitting windings 1003. Thus, the phased induction fields are focused into the disk 1001. The receiving windings 1002 enclose the fields channeled through the disk 1001.

For inductive heating applications, the windings 1002 are eliminated and disk 1001 is used as a heating element. In these applications, disk 1001 is fabricated with a lossy ferrite typically used in inductive heating.

In the present invention, with the largest dimension less than approximately 1/10 of a wavelength, the spatial phase of the fields is essentially independent of frequency. The bandwidth of the system is then approximately BW=c/(10× largest dimension) where c is the speed of light.

Power and communications signals at various frequencies can be transmitted across the same system. Within the above bandwidth, positional independence is maintained without requiring any changes in system dimension. This is in contrast to RF radiating systems in which antenna elements are optimally dimensioned at only one frequency.

As mentioned previously, communication signals can be transmitted with the power signal by frequency modulating the power signal or by overlaying the power signal. Overlaying the power signal is achieved by driving the generating elements with a higher frequency communication signal having the same spatial phasing as the power signal. Thus, the overlaid signal is available to the receiver with the same positional independence as the power signal.

The present invention can also be used solely as a communications system. In these applications, frequency or phase modulation is preferred over amplitude modulation due to the amplitude variation of the coupled signals.

In the above embodiments, two distinct types of power couplings were presented: capacitive, wherein the electric field dominates, and inductive, wherein the induction field dominates. Also within the scope of the present invention are power couplings wherein the induction and electric field components are combined and have approximately equal proportion. This could be accomplished by integrating inductive windings with capacitive elements on a printed circuit board.

The incremental phase shift between power sources can be made programmable by computer. This would allow for adaptation to a variety of size and shape receivers.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is my intent they be deemed within the scope of my invention.

I claim:

1. An electromagnetic near field power coupling system for noncontact, electric power coupling, comprising:
    a transmitter comprised of:
        a series of phase shifted power sources,
        a series of near field generating elements, sequentially connected to said power sources in order of increasing phase, and
    a receiver comprised of:
        a load having a first and a second terminal, a first near field receiving element being coupled to the first terminal of said load,
        a second near field receiving element being coupled to the second terminal of said load, said receiver being near field coupled to at least two of said generating elements;
    wherein said transmitter and said receiver form a complete circuit with both terminals of said load being coupled by electromagnetic near field to said power sources with said load being mechanically independent of said generating elements.

2. The mobile power coupling system according to claim 1 wherein said near field generating elements and said near field receiving elements are comprised of capacitive plates.

3. The mobile power coupling system according to claim 2 wherein said near field generating capacitive plates are essentially rectangular.

4. The mobile power coupling system according to claim 2 wherein said near field receiving capacitive plates are wedge shaped and are placed radially to form a segmented disc.

5. The mobile power coupling system according to claim 1, further including means for power regulation between said near field receiving elements and said load.

6. The mobile power coupling system according to claim 1, further including means for superimposing control signals on said near field.

7. The mobile power coupling system according to claim 1, further including means for receiving said control signals.

8. An electromagnetic near field power coupling system for noncontact, position independent, power coupling to a mobile load, comprising:
    a series of phase shifted power sources,
    a series of electromagnetic near field generating inductive windings, sequentially connected to said power sources in order of increasing phase, and
    an inductive power receiving element connected to said mobile load and coupled to at least two of said generating inductive windings;
    wherein said receiving element and said mobile load are mechanically independent of said electromagnetic field generating inductive windings.

9. The electromagnetic near field power coupling system according to claim 8 wherein said inductive power receiving element is comprised of one or more inductive windings wound together in an essentially circular loop.

10. The electromagnetic near field power coupling system according to claim 8 wherein said inductive power receiving element is comprised of one or more inductive windings wound onto a ferrite disk.

11. The electromagnetic near field power coupling system according to claim 8 wherein said inductive power receiving element is comprised of a glossy ferrite disk for generating heat.

12. The electromagnetic near field power coupling system according to claim 8, further including means for power regulation between said inductive power receiving element and said load.

13. The electromagnetic near field power coupling system according to claim 8, further including means for superimposing control signals on said near field.

14. The electromagnetic near field power coupling system according to claim 8, further including means for receiving said control signals.

* * * * *